United States Patent
Kim et al.

(10) Patent No.: US 9,445,271 B2
(45) Date of Patent: Sep. 13, 2016

(54) MULTI-USER USE OF SINGLE-USER APPS

(71) Applicant: MOBILE IRON, INC., Mountain View, CA (US)

(72) Inventors: Mansu Kim, Cupertino, CA (US); Suresh Kumar Batchu, Milpitas, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

(21) Appl. No.: 14/195,704

(22) Filed: Mar. 3, 2014

(65) Prior Publication Data

US 2014/0250505 A1 Sep. 4, 2014

Related U.S. Application Data

(60) Provisional application No. 61/771,487, filed on Mar. 1, 2013.

(51) Int. Cl.
*H04L 29/06* (2006.01)
*H04W 12/08* (2009.01)

(52) U.S. Cl.
CPC .................................. *H04W 12/08* (2013.01)

(58) Field of Classification Search
CPC ... H04W 12/08; H04W 12/00; H04W 4/003; G06F 21/10; G06F 21/629; G06F 21/6218
USPC .......... 726/3, 2, 16; 709/225, 219; 707/621, 707/783, 19; 713/193; 1/3, 2, 16
See application file for complete search history.

(56) References Cited

U.S. PATENT DOCUMENTS

| | | | |
|---|---|---|---|
| 6,684,259 B1 | 1/2004 | Discavage et al. | |
| 6,714,962 B1 | 3/2004 | Helland et al. | |
| 7,770,134 B2 | 8/2010 | Evans et al. | |
| 2012/0102574 A1* | 4/2012 | Schentrup | G06F 21/6218 726/28 |
| 2014/0108594 A1* | 4/2014 | Siegel et al. | ................. 709/217 |

OTHER PUBLICATIONS

Thales (Jun. 8, 2012). WO213/181749A1.*
PRNewswire (Sep. 28, 2011). MobileIron AppConnect: The Best Way to Secure Enterprise Mobile Apps. Retrieved Apr. 23, 2014 from http://www.prnewswire.com.*

* cited by examiner

*Primary Examiner* — Brian Shaw
(74) *Attorney, Agent, or Firm* — Van Pelt, Yi & James LLP (57) ABSTRACT

Multi-user use of single-user applications is disclosed. A request to access application data associated with an object identifier may be received in a context of a single-user application. Access may be provided to one or more application data objects associated with the object identifier. The objects may be included in a data set corresponding to user information associated with the context of the application.

23 Claims, 6 Drawing Sheets

MULTI-USER USE OF SINGLE-USER APPS

CROSS REFERENCE TO OTHER APPLICATIONS

This application claims priority to U.S. Provisional Patent Application No. 61/771,487 entitled MULTI-USER USE OF SINGLE-USER APPS filed Mar. 1, 2013 which is incorporated herein by reference for all purposes.

BACKGROUND OF THE INVENTION

Mobile applications are widely used in many different environments including enterprise, personal, and other settings. Many applications used in these settings are designed for use by a single user. For example, many enterprise applications (e.g., managed browsers, file access applications, document viewer applications, etc.) are designed to be used by a single employee. In certain cases, however, multiple users may want and/or need to use a single-user application on a mobile device.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Multi-user use of single-user applications is disclosed. The techniques disclosed herein allow mobile applications designed (e.g., originally developed) for a single-user use to be used by multiple users without changes to the underlying application (e.g., application code/binary). In some embodiments, a multi-user library may be associated with an application, and the library may be used to configure the application based on a user associated with a context of the application (e.g., a current user). For example, a data set (e.g., user sandbox) may be generated for each of one or more users of an application. And the multi-user library may switch to a user's data set when the user logs in to the mobile device, opens the application, and/or performs other operations.

In various embodiments, a request to access application data associated with an object identifier may be received in a context of a single-user application. Access may be provided to one or more application data objects associated with the object identifier. The objects may be included in a data set corresponding to user information associated with the context of the application. In some embodiments, the application data objects associated with a user may be retrieved (e.g., at the application). The application data objects may include, for example, user documents, settings, configurations, and/or other data objects associated with the application.

Figure 1:
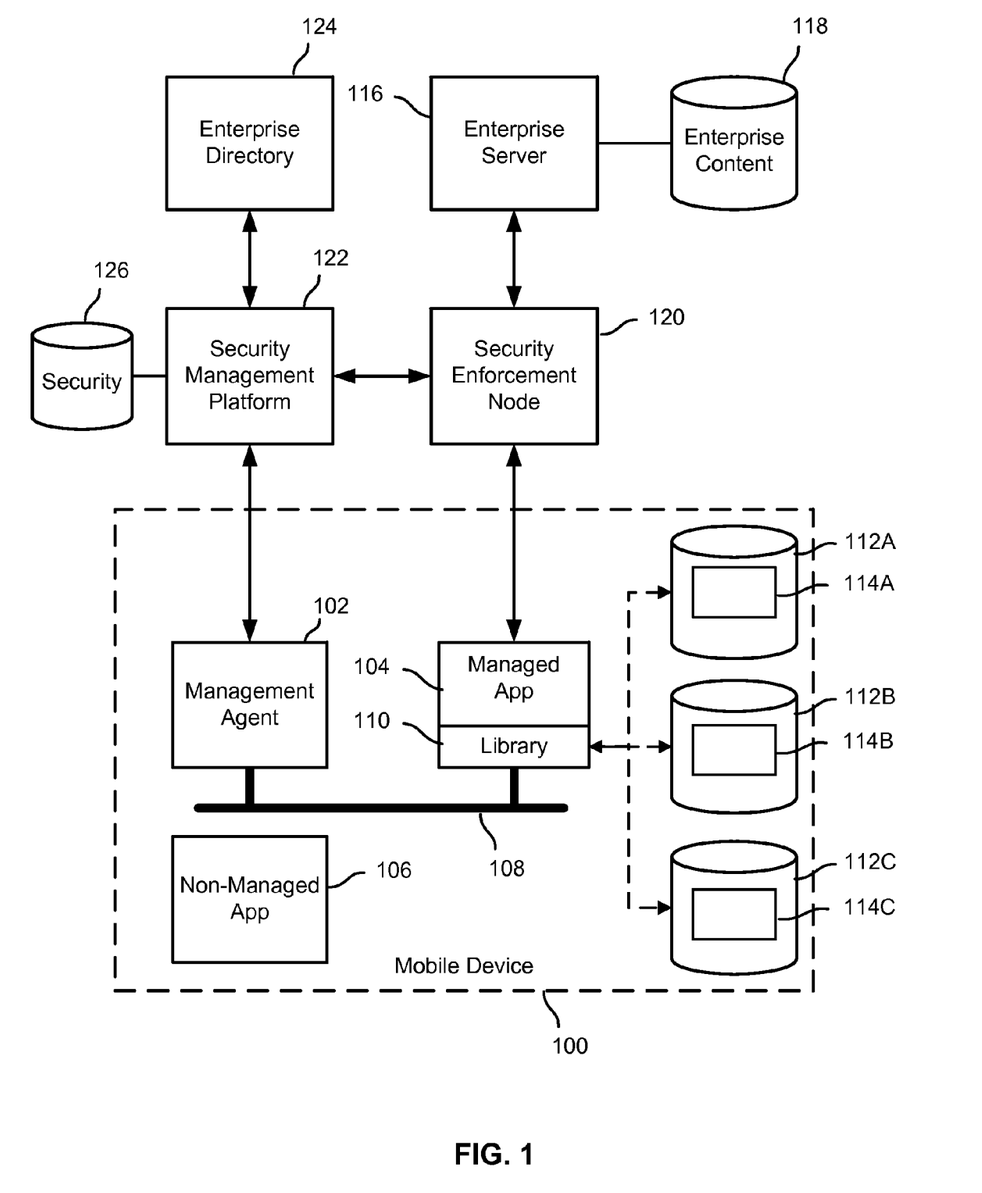
FIG. 1 is a block diagram illustrating an embodiment of a system including a single-user application configured for multi-user use.

FIG. 1 is a block diagram illustrating an embodiment of a system including a secure mobile application connection bus. In the example shown, a mobile device 100 (e.g., smartphone, tablet, etc.) includes a management agent 102 (e.g., a mobile device management (MDM) agent, a trusted management agent, trust client app), managed application(s) 104 (e.g., single-user application(s)), non-managed application(s) 106 (e.g., non-authorized application(s), untrusted application(s)), and/or other applications. The management agent 102, managed applications 104, and/or other components may be components of an MDM system.

In some embodiments, a library 110 (e.g., multi-user support library, multi-user library) may be associated with a managed application 104 (e.g., a single-user application). The library 110 may modify an application's code to behave differently than the corresponding unmodified version of the application behaves. For example, a managed application 104 may be designed to be used by a single user and may, for example, include no native and/or inherent multi-user support. In various embodiments, the library 110 may configure (e.g., reconfigure) a managed application 104 designed for single-user use to support multiple users. The library 110 may, for example, generate data sets 112A, 112B, 112C (e.g., user sandboxes) for each of one or more users (e.g., of the application, MDM framework, mobile device). For example, a first user of the managed application 104 may be allotted a first data set 112A, a second user may be allotted a second data set 112B, a third user may be allotted a third data set 112C, and so on. In various embodiments, each data set 112A, 112B, 112C may include one or more application data objects 114A, 114B, 114C, other data sets (e.g., data subsets), and/or other information. For example, a first user of a managed application 104 may be associated with a data set 112A including one or more application data objects 114A. In various embodiments, a data set 112A, 112B, 112C associated with a user may include a user sandbox (e.g., associated with the user).

In various embodiments, the library 110 may configure the managed application 104 to allow the management agent 102 to perform actions on behalf of the managed application 104 including invoking mobile operating system components, using mobile device resources, and/or accessing/storing application data. The library 110 may mediate communication between a managed application 104 and the management agent 102 and/or other managed application(s) 104. The library 110 may, in some embodiments, apply configuration changes, enforce policies, execute actions, and/or perform other operations within the managed application 104.

According to various embodiments, the management agent 102, managed applications 104, and/or other elements are configured to transfer data in a trusted manner (e.g., securely) via a secure mobile application connection bus 108 (e.g., secure inter-application connection bus, secure application command bus, secure application communication bus, etc.). In some embodiments, data may be transferred in a trusted manner among applications authorized to have access to the secure mobile application connection bus 108 by storing the data in an encrypted form in a data storage location (e.g., a paste board, shared keychain location, and/or other storage), which is accessible to the entities authorized to communicate via the bus 108. In various embodiments, data may be transferred in a trusted manner from a first application (e.g., the management agent 102) to a second application (e.g., a managed application 104) authorized to have access to the secure mobile application connection bus 108 by calling a uniform resource locator (URL) scheme associated with the second application including the encrypted data.

According to various embodiments, communications between the mobile device 100 and enterprise backend server(s) 116 (e.g., enterprise servers, file server, email server, application servers, etc.), enterprise content 118 (e.g., files, enterprise data), network resources, and/or other components may pass through a security enforcement node 120 (e.g., a reverse proxy server, sentry). In various embodiments, the security enforcement node 120 is a reverse proxy for synchronization, data transfer, and/or other traffic between managed applications 104 and enterprise servers such as the backend server 116. While processing (e.g., managing) the traffic (e.g., securely transferred data), the security enforcement node 116 may optimize traffic (e.g. compress) and/or add, modify, and/or remove content based on one or more policies from security management platform 122.

In various embodiments, a security management platform 122 (e.g., a virtual smartphone platform, security management server, etc.) manages configurations, policies, and/or settings associated with the one or more of the managed applications 104 on the mobile device 100. For example, the security management platform 122 may communicate with managed applications 104 (e.g., libraries 110 associated with managed applications 104) using the management agent 102 as an intermediary.

In some embodiments, the security management platform 122 may validate user credentials associated with managed applications 104. For example, a user may provide credentials in a context of the management agent 102, managed application 104, and/or other application on device 100. The user credentials may be provided to the security management platform 122 for validation and/or verification. In some embodiments, the security management platform 122 may validate the user credentials using, for example, an enterprise directory 124, a security information repository 126 (e.g., local data repository), and/or other node. In some embodiments, the enterprise directory 124 may include an enterprise data repository including, for example, user (e.g., employee) information, group information, device information, and/or other information associated with an enterprise. The security management platform 122 may validate user credentials by, for example, querying the enterprise directory 124 based on the user credentials.

According to some embodiments, the security management platform 122, management agent 102, and/or other node may determine whether a user is authorized to access managed applications 104 on the mobile device 100. In some embodiments, the security management platform 122 may determine user authorization based on device status, user status, and/or other information stored in a security information repository 126. The security information repository 126 may, for example, include managed applications, policies, and/or other information. In addition, the security information repository 126 may also include device status information (e.g., jailbreak status, application installation status, security status, etc.). For example, the security management platform 122 may determine whether a user is authorized to access one or more manage application 104 based on a query of the security information repository 126. In the event the user is authorized to access the managed applications 104, authorization information may be provided to the management agent 102 (e.g., from the security management platform 122).

In various embodiments, the security information repository 126 may include application configuration information associated with a user (e.g., specific to a user). For example, the application configuration information may include user information (e.g., associated with one or more users) and application data sets 112A, 112B, 112C (e.g., application sandboxes) associated with (e.g., corresponding to) the user information. The application configuration information may be used (e.g., by the multi-user library 110) to configure a managed application 104 for use by a specific user. In some embodiments, the application configuration information may be used to configure an application such that data associated with a user (e.g., application data objects associated with a user) is accessible within a context of the application.

According to various embodiments, the security management platform 122 may provide (e.g., push) to the management agent 102 authentication, authorization, application configuration information and/or other information. The management agent 102 may provide the application configuration information to one or more managed applications 104 (e.g., via the secure application connection bus 108). In some embodiments, a library 110 associated with a managed application 104 may retrieve the application authentication, authorization, and/or configuration information from the secure bus 108. The library 110 may configure the managed application 104 in such a way that a data set 112A associated with a user is accessible within a context of the managed application 104.

Figure 2:
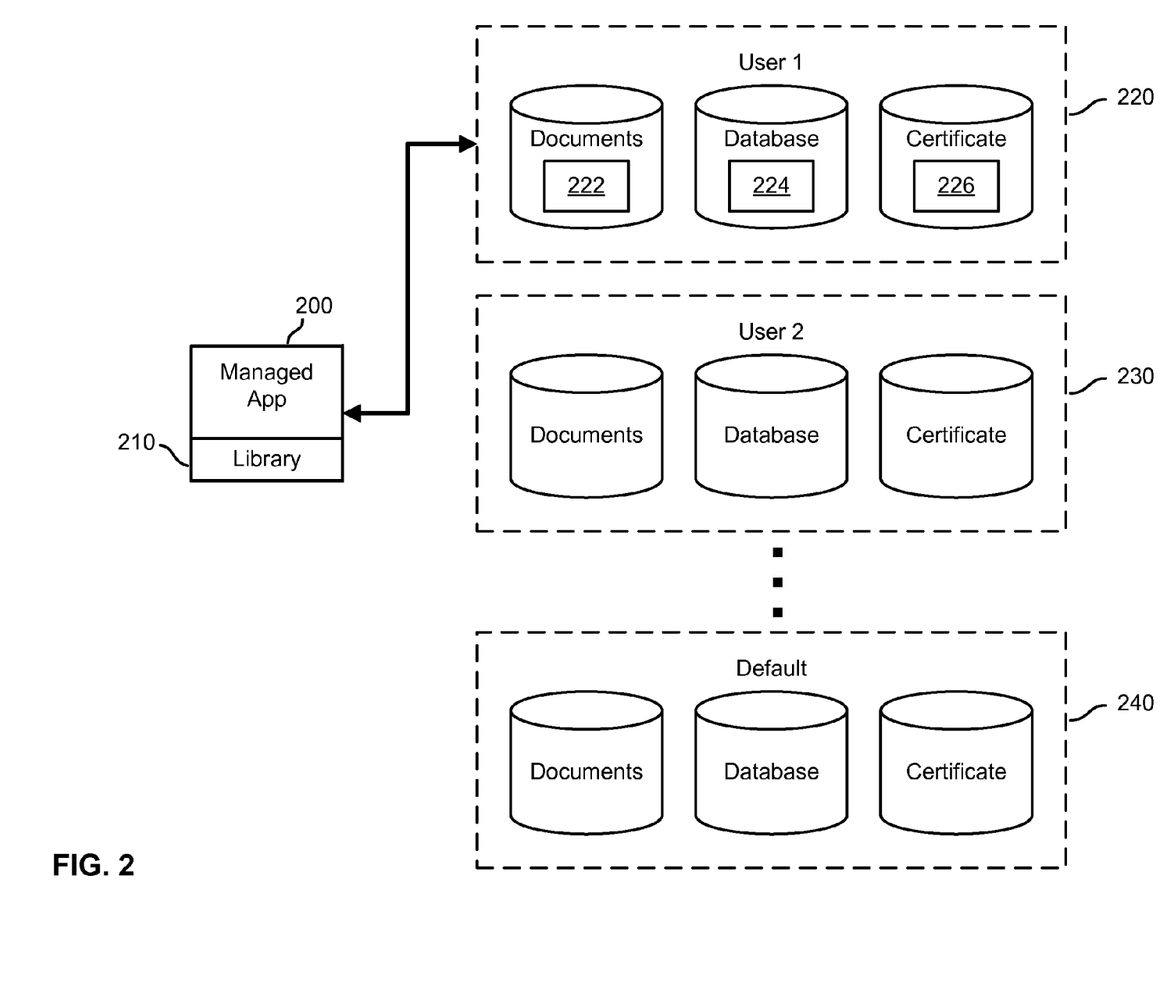
FIG. 2 is a block diagram of an embodiment of a single-user application configured for multi-user use.

FIG. 2 is a block diagram of an embodiment of a single-user application configured for multi-user use. In some embodiments, an application 200 (e.g., an application developed for single user use) may be associated with a multi-user library 210. The multi-user library 210 may provide multi-user functionality to the application 200 without modification (e.g., significant modification) of the application 200 code (e.g., the application binary). In various embodiments, the library 210 may generate user data sets 220, 230 each corresponding to a user of the application 200. For example, the application 200 may be used by a first user (e.g., a first employee, a first family member), a second user (e.g., a second employee, a second family member), and/or other users. In various embodiments, an application may be associated with a default data set 240 (e.g., a default application sandbox). The default data set 240 may be used as template (e.g., copied and modified) to generate data sets 220, 230 (e.g., user sandboxes) for one or more users (e.g., each user) of an application. For example, a data set 220 may be generated that corresponds to a first user (e.g., User 1). Similarly, a data set 230 may be generated that corresponds to a second user (e.g., User 2).

In various embodiments, when the application 200 is launched (e.g., changes state) user information associated with a context of the application 200 may be determined. The multi-user library 210 may, for example, determine user information for a current user of the application context (e.g., the user information may be retrieved from a secure application connection bus). For example, it may be determined that a first user (e.g., associated with a first user information) is using the application. Based on this determination, the application 200 may be configured to access application data objects 222, 224, 226 included in (e.g., stored in) data set(s) 220 associated with the first user (e.g., User 1). In another example (not shown), the application 200 may be launched by a second user (e.g., User 2) at later time (e.g., after User 1 has closed the application and logged out of the MDM framework). The multi-user library 210 may determine that the second user is using the application. Based on this determination, the application 200 may be configured to access application data objects included in data set(s) 230 associated with the second user (e.g., User 2). In another example (not shown), it may be determined that no registered/recognized/authorized user is currently associated with the context of the application. For example, a user currently using the application may not be associated with the MDM framework. In this case, the application 200 may be configured to access application data objects included in a default data set 240 (e.g., default sandbox).

In various embodiments, the multi-user library 210 may provide access to a data set (e.g., data set 220 associated with a first user) by directing calls (e.g., API calls from the application) to point to the data set. For example, the application 200 may be configured (e.g., at time of development) to access application data objects from a default location (e.g., container, directory). The application 200 may, for example, be configured to access (e.g., retrieve and store) user documents in a directory "<Application123_Home>/Documents." In certain cases, based on a determination that a first user (e.g., User 1) is using the application (e.g., associated with a current context of the application), the library 210 may redirect the application to access (e.g., point to) a directory "<Application123_Home>/Documents/User1." This directory may, for example, include the first data set 220 and may include document data object(s) 222 associated with the first user. In certain cases, the directory "<Application123_Home>/Documents/User1" and data set(s) 220 stored therein may have been generated (e.g., by the multi-user library 210) when the first user (e.g., User 1) initially launched the application 200. Similar directories may also be generated for other users (e.g., User 2) and/or default users.

In some embodiments, access may be provided (e.g., by the multi-user library 210, application 200, etc.) to a data set by transferring the data set from a remote storage location to, for example, a directory accessible to the application 200. For example, application data sets may be stored in a remote location (e.g., an enterprise data repository 118 of FIG. 1, cloud storage, and/or any other location) when a user associated with the data set is not using the application 200. Based on a determination that a user is associated with a context of the application (e.g., using the application), a data set associated with that user may be transferred from a remote storage location to storage location accessible to the application 200 (e.g., on the mobile device). For example, it may be determined that a first user (e.g., User 1) is associated with a context of the application, and based on that determination, a first data set 220 associated with the first user may be transferred from a remote storage location (e.g., an enterprise storage repository) to a directory (e.g., "<Application123_Home>/Documents/User1") accessible to the application 200. In some embodiments, upon a determination that the first user is no longer using the application (e.g., another user is using the application), the first data set 220 may be transferred (e.g., returned) to the remote storage location.

According to some embodiments, data sets associated with users that are not currently using the application 200 may be secured (e.g., encrypted). For example, it may be determined that a first user (e.g., associated with a first user information) is using the application. Based on this determination, the application 200 may be configured to access application data objects 222, 224, 226 included in (e.g., stored in) a first data set 220 associated with the first user (e.g., User 1). In this case, data sets associated with other users (e.g., a second data set 230, default data set 240, etc.) may be encrypted. Encrypting data sets not associated with a context of the application may, for example, prevent a current user of the application from accessing data associated with other users of the application. Upon a determination that a different user (e.g., User 2) is using the application, the data set associated with that user (e.g., User 2) may be decrypted, and the data set associated with the previous user (e.g., User 1) may be encrypted. For example, it may be determined that a second user is using the application (e.g., User 2) and/or a first user (e.g., User 1) was previously using the application (e.g., the first user was the most previous user). Based on this determination, the application 200 may be configured to access the second data set 230 associated with the second user by, for example, decrypting the second data set 230. Similarly, the first data set 220 may be encrypted to, for example, prevent the second user from accessing the first data set 220 (e.g., associated with the first user).

In some embodiments, data sets associated with users that are not currently using the application 200 may be compressed. For example, it may be determined that a first user (e.g., associated with a first user information) is using the application and the application may be configured to access a first data set 220 associated with the first user. Based on this determination, data sets associated with other users (e.g., a second data set 230, default data set 240, etc.) may be compressed. In some embodiments, compressing data sets associated with users not currently using the application may save (e.g., conserve) storage on the mobile device and/or application 200.

Figure 3:
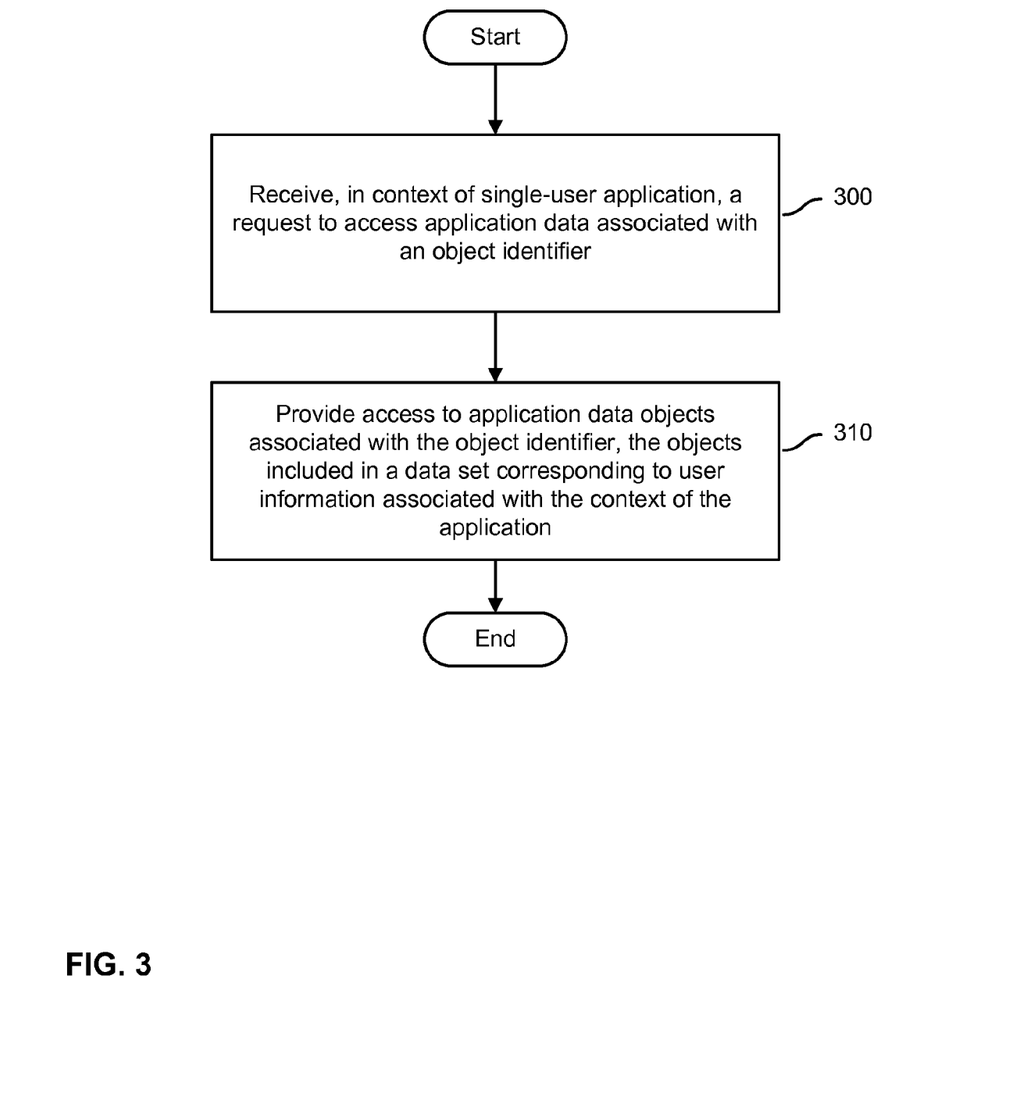
FIG. 3 is a flowchart illustrating embodiments of a process of providing multi-user access in an application.

FIG. 3 is a flowchart illustrating embodiments of a process of providing multi-user access in an application. In various embodiments, the process is performed by the system 100 of FIG. 1. At 300, a request to access application data associated with an object identifier may be received in a context of a single-user application. In various embodiments, application data may include, for example, user data (e.g., documents, images, web pages, and/or any data associated with an application user), application configuration data (e.g., settings, user interface data, user identification data), application security data (e.g., security certificates, keychain data, authentication data), and/or any other data associated with an application. In some embodiments, application data may be associated with an object identifier. For example, an object identifier may include a string, text, number(s), argument, file name, directory locations, and/or any other information used to identify an application data object. An object identifier associated with application data may, for example, include a pointer to a storage location that includes the application data object.

In various embodiments, a request to access application data associated with an object identifier may be received during the operation of an application. For example, when an application transitions from an inactive state to an active state (e.g., comes to the foreground), application code may be executed to initialize the application and/or perform other operations. The application code may include one or more calls to application data associated with an object identifier. For example, a managed web browser code may be configured based on a user's settings, data, and/or other information. During initialization of an application session (e.g., when the application is opened, when a user logs into an MDM system, etc.), calls may be executed to retrieve browser data cache, authentication cookies, browsing history, certificate information, identity certificate store, and/or other application data. Each of these calls may be associated with an object identifier (e.g., identifying a storage location in which browser data cache, cookies, and/or other information resides).

In various embodiments, API and/or other calls to application data (e.g., file i/o calls) associated with one or more object identifiers may be made at any time during operation of an application. For example, API calls including object identifiers (e.g., a call to retrieve an object associated with an identifier) may be made continuously during an application session for a variety of purposes.

In some embodiments, a request to access application data associated with an object identifier may be received based on a user generated command in a context of an application. For example, a user may execute a command within a context of an application, and application data may be requested as part of the execution of the command. In one example, a command may be received in a file access application (e.g., an enterprise cloud file access application) to access a certain file folder. The request to access the file (e.g., a document) may be received within the file access application (e.g., by a library associated with the file access application), and the file folder access request may be associated with an object identifier (e.g., information identifying the location of the file).

At 310, access may be provided to application data objects associated with the object identifier. The data objects may be included in a data set corresponding to user information associated with the context of the application. In various embodiments, application data objects may be stored (e.g., arranged) in data sets. For example, a data set may be a folder, container, label, storage location, and/or other data structure including application data objects. In certain cases, a data set may include one or more data subsets. In some embodiments, one or more data sets associated with a user may comprise a user sandbox. One or more user sandboxes (e.g., user data sets) may be included in an application sandbox. For example, an application may be provided access to different user sandboxes depending on which user is associated with a context of the application.

According to various embodiments, a data set may correspond to (e.g. be associated with) user information (e.g., information associated with a user). A data set corresponding to user information may include, for example, application data objects associated with the user. In one example, data sets may include a documents data set, database data set, library data set, temporary storage data set, certification data set, and/or other data sets (e.g., subsets). The application data objects associated with a user may, for example, be included in a data set associated with a user. For example, a documents data set may include user-generated data objects (e.g., documents, images, videos, and/or other user-generated content), data objects received by a user, application data objects (e.g., application data files), and/or any other user-related data objects. A database data set may include, for example, database query files, search queries, and/or other database information associated with a user. A library data set associated with a user may include data file objects, cache objects, resources, preferences, and/or other user-associated data. A temporary storage (e.g., temp) data set associated with a user may include temporary cache files, temporary data files, and/or files that need not persist beyond a period of time (e.g., between launches of the application).

In some embodiments, an application (e.g., a single-user application) may, based on user information associated with a context of the application, be provided access (e.g., by a library associated with the application) to data set(s) corresponding to the user information. For example, a mobile device may be used by multiple users (e.g., multiple employees in an enterprise, members of family, friends, etc.). And using the techniques disclosed herein, one or more mobile applications (e.g., single-user applications) may be configured for multi-user use. As part of this configuration, data sets (e.g., application data sandboxes) including application data objects may be generated for multiple users. In certain cases, an application may be associated with (e.g., potentially have access to) data sets for multiple users. For example, a first data set (e.g., including application data objects) may correspond to a first user of the mobile application, a second data set may correspond to a second user of the mobile application, and so on. In some embodiments, an application may be provided access to data sets corresponding to a user of a context of the application (e.g., a session of the application). For example, an application may be provided access to data sets associated with a current user of the application.

In various embodiments, access may be provided to application data objects included in a data set corresponding to user information by redirecting application programming interface (API) and/or other calls made within the context of the application. In some embodiments, during execution of the application code, the multi-user library may, for example, redirect API calls made to a first location (e.g., a default data set, a data set associated with a previous application user) to be made to a data set associated with a current user of the application. For example, an application may be initially configured (e.g., in development) to direct certain API calls to a default data set. During operation (e.g., at application runtime), the multi-user library associated with the library may, however, redirect these calls to a data set associated with user information (e.g., user information determined to be associated with the current context of the application). In one example, file input/output (i/o) calls made during execution of the application code may be redirected (e.g., by the multi-user library) from a first data set (e.g., a default data set, a data set associated with a previous application user) to a second data set (e.g., a data set associated with the user information).

Figure 4:
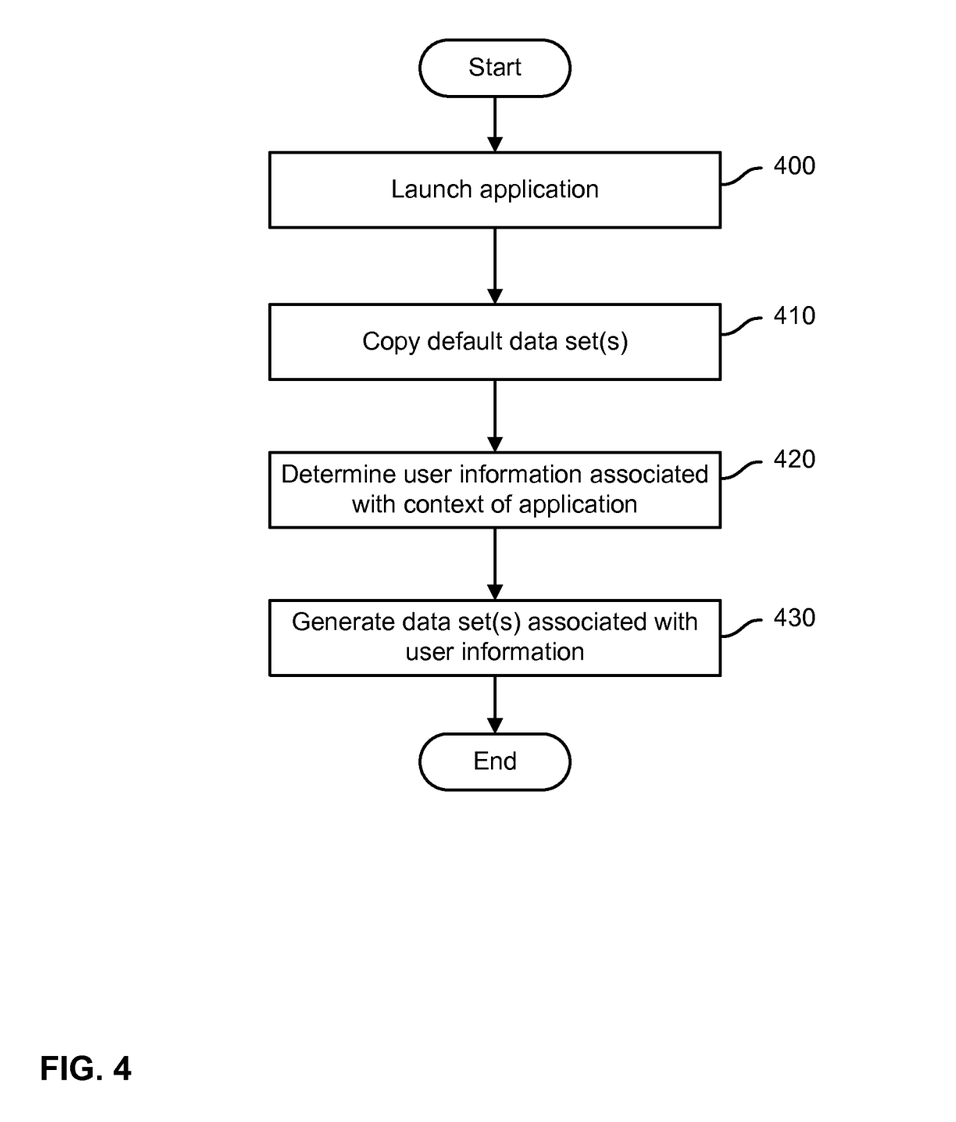
FIG. 4 is a flowchart illustrating embodiments of a process of configuring an application for multi-user use.

FIG. 4 is a flowchart illustrating embodiments of a process of configuring an application for multi-user use. In various embodiments, the process is performed by the system 100 of FIG. 1. At 400, an application may be launched. In various embodiments, a single-user application including a multi-user library may be launched for a first time. For example, the application may have been downloaded (e.g., recently downloaded) to the device (e.g., from an enterprise application store), deployed to the device, and/or other installed on the device.

At 410, default data set(s) associated with an application may be copied. In various embodiments, default data set(s) associated with the application may be copied and/or saved as separate data set(s). By way of example, a default data set for an application may include one or more data subsets (e.g., a documents data subset, temp data subset, library data subset, etc.). Default data set(s) may include the location(s) where data may be stored in the during single-user use of an application. The default data sets for the application may be stored at a location (e.g., in a container) on the mobile device (e.g., in a sandbox associated with the application, a directory on the mobile device internal/external storage). For example, a default documents data set for an application may be stored in a container directory entitled "<Application123_Home>/Documents." In some embodiments, as part of the copying operation, a new container (e.g., directory location) may be generated to include the default data set(s). For example, a default documents data set may be relocated to (e.g., moved to, copied to) a directory entitled "<Application123_Home>/Documents/Default."

At 420, user information associated with a context of the application may be determined. In various embodiments, user information associated with a context of an application (e.g., a user application session) may include user information associated with a current user of the application. In certain cases, user information for a user (e.g., the current user) of the application may be retrieved from an application connection bus accessible to the application. For example, a user may log-in to the management agent associated with the mobile device. Upon verification/authentication of the user, user information associated with the user may be provided (e.g., from the management agent) to the secure application connection bus. And a library associated with the application may retrieve the user information from the secure application connection bus (e.g., a secure storage location).

At 430, data set(s) associated with the user information may be generated. In some embodiments, the application (e.g., the multi-user library associated with the application) may generate a data set associated with (e.g., corresponding to) the user information. In various embodiments, the copied default data set may be processed (e.g., configured) to be associated with the user information. For example, the default data set(s) may be used as a template to generate data set(s) associated with the user information. In certain cases, a new container (e.g., directory location) may be generated for the data subsets associated with the user (e.g., "<Application123_Home>/Documents/User1").

Figure 5:
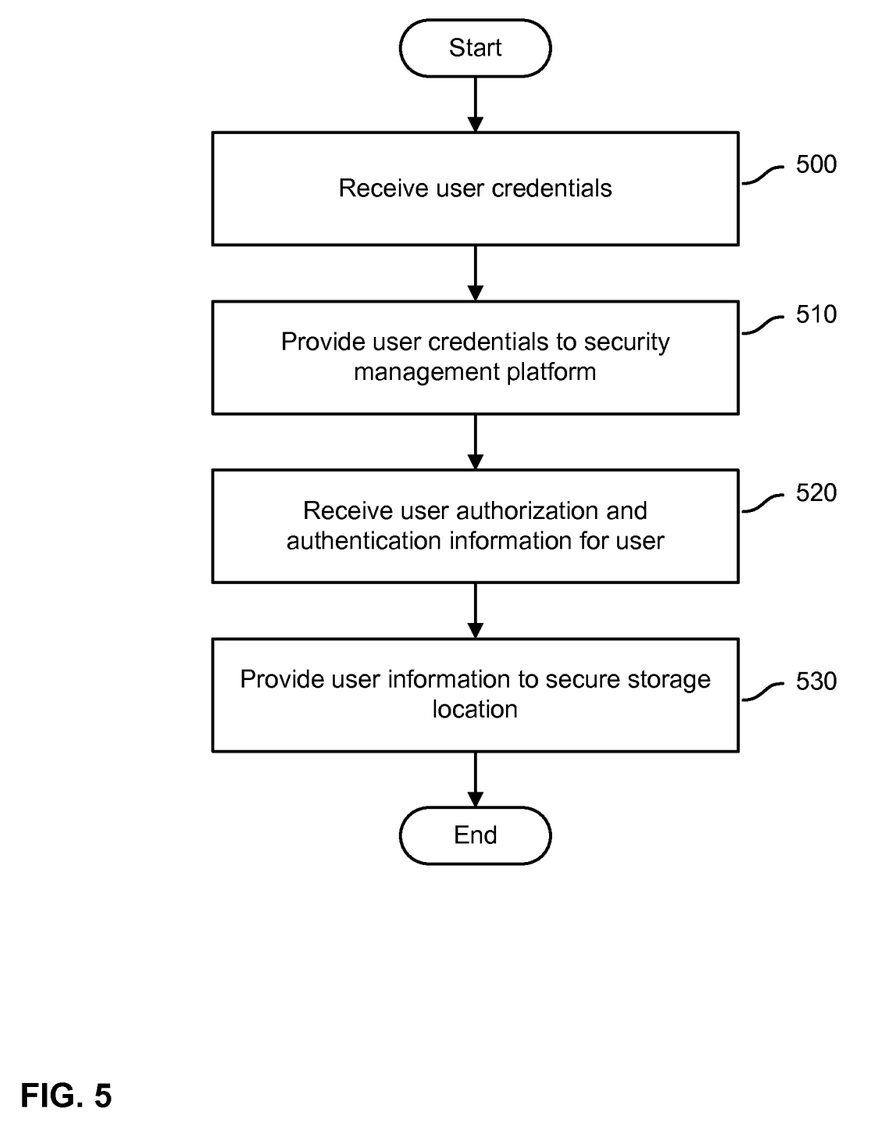
FIG. 5 is a flowchart illustrating embodiments of a process of determining user information.

FIG. 5 is a flowchart illustrating embodiments of a process of determining user information. In various embodiments, the process is performed by the system 100 of FIG. 1. At 500, user credentials may be received. In various embodiments, user credentials may be received at a management agent (e.g., management agent 102 of FIG. 1) associated with an MDM framework (e.g., including one or more managed applications). For example, a user may log-in to the management agent that manages a single-user application configured for multi-user use as discussed herein. During the log-in process, the user may provide to the management agent user credentials (e.g., user identification (ID), password, name, email address, and/or other credentials).

At 510, user credentials may be provided to a security management platform. In some embodiments, the user credential information may be validated at a security management platform. For example, the security management platform may validate the credential information with data in an enterprise directory, a security management platform associated database, and/or other repository including credential information. In various embodiments, the credential information may be validated (e.g., by the security management platform) by comparing the credential information received from the management agent with a stored list of credential information for the set of protected applications.

In various embodiments, the security management platform may query (e.g., look up) application authorization information for the user (e.g., based on the received credentials). For example, the authorization information may include application permissions, settings, and/or other information associated with a user.

At 520, authorization and authentication information for the user may be received (e.g., by the management agent). In some embodiments, the security management platform may provide authorization information (e.g., authorization status information (e.g., a list of protected applications in the set of protected applications, policies)), and/or other information to the management agent. For example, upon validation of the credential information, application authorization information, device status information, and/or other parameters, the security management platform may securely provide (e.g., push) user information to the management agent.

At 530, user information may be provided to a secure storage location. In some embodiments, the management agent may update the secure storage location with user information, authentication information, authorization information, session expiration time period(s), and/or other information. The following is an example of information that may be provided to the shared storage location:
{authenticationExpire=1343071545, AuthorizedApps=[
 {appid=company.files.Se},
 {appid=company.browser.Be},
 {appid=company.SFA.Ae},
 {appid=company.viewer.De}], zoneLock=false}.

In some embodiments, the information may be retrieved by one or more applications (e.g., multi-user libraries associated with applications). For example, a multi-user application library may retrieve the information, and determine, based on the retrieved information, user information associated with the user currently logged in to the MDM framework.

Figure 6:
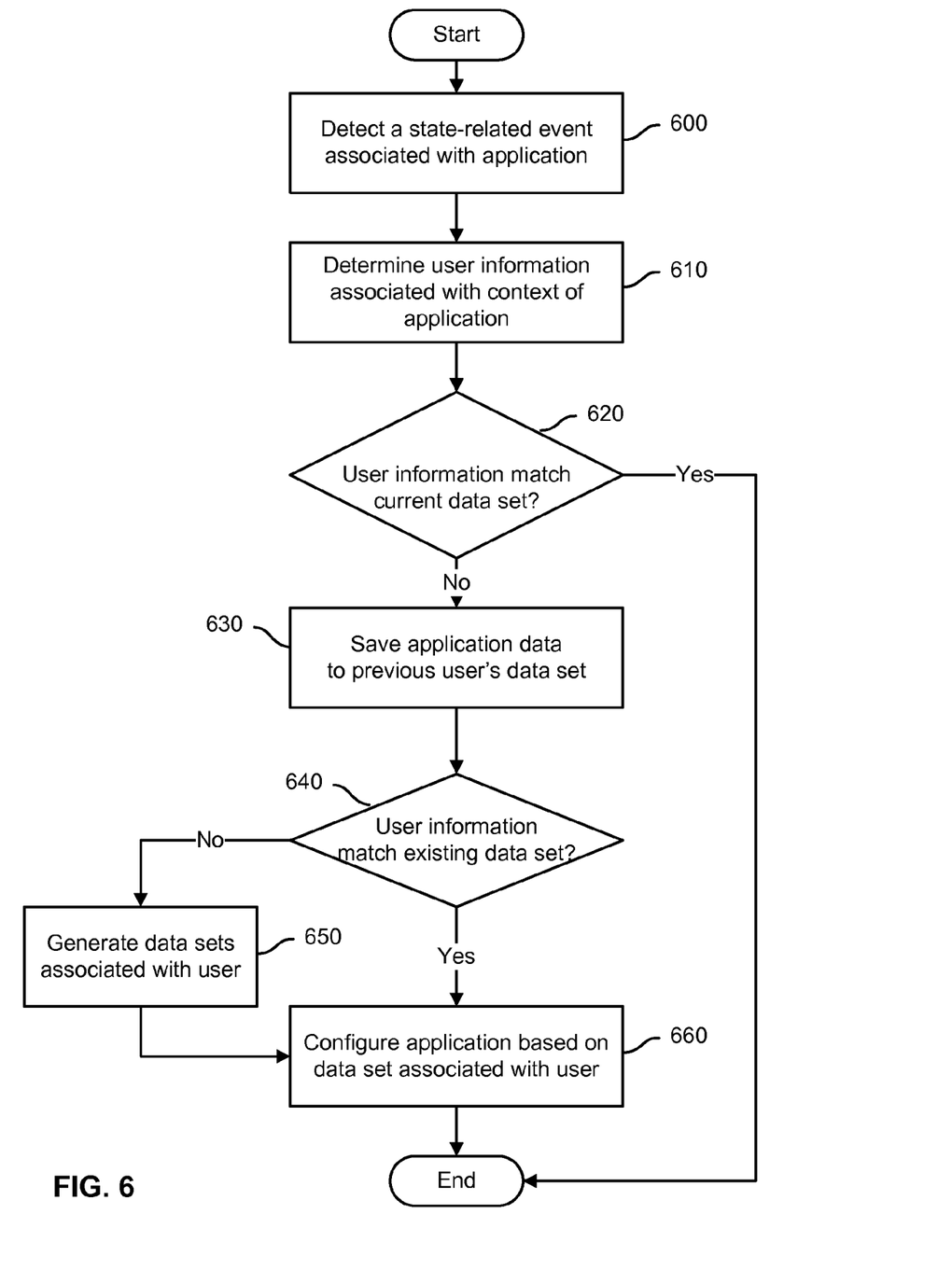
FIG. 6 is a flowchart illustrating embodiments of a process of configuring an application for multi-user use.

FIG. 6 is a flowchart illustrating embodiments of a process of configuring an application for multi-user use. In various embodiments, the process is performed by the system 100 of FIG. 1. At 600, a state-related event associated with an application may be detected. In various embodiments, a state-related event may include any event associated with the state of an application. For example, states associated with an application may include foreground (e.g., application is active an receiving events), active (e.g., application running in foreground and receiving events), inactive (e.g., in foreground but not currently receiving events), background (e.g., in background and executing code, transitioning from foreground to suspended), suspended (e.g., application is in the background and is not executing code, remains in memory but does not execute any code), not running (e.g., application is not launched, terminated, killed, etc.), and/or any other state associated with an application. A state-related event associated with an application may occur when the application changes state. For example, a state-related event may occur when an application moves to the foreground (e.g., becomes active).

At 610, user information associated with a context of the application may be determined. In various embodiments, user information associated with a context of an application may include user information associated with a user of the application (e.g., a user who launched the application). In certain cases, user information for a user (e.g., the current user) of the application may be determined by retrieving the user information from an application connection bus accessible to the application.

At 620, it may be determined whether the user information matches user information associated with the data set currently associated with the application. In various embodiments, an application may be configured (e.g., by a multi-user library) to point to (e.g., retrieve) application data objects stored in a data set. In certain cases, the data set may include default data sets and/or data sets associated with a user (e.g., a data set corresponding to a user, a user sandbox, etc.).

In some embodiments, it may be determined whether the user information associated with a current context of the application (e.g., the user currently logged into the MDM framework) matches the user associated with the data set currently linked to the application. For example, a current data set (e.g., the data set currently linked to the application) may include a data set from which the application last retrieved application data objects, to which the application last provided application data objects to, and/or with which the application otherwise last interacted. In another example, the current data set may include a data set associated with a user that previously launched the application (e.g., last launched the application). In one example, it may be determined that the multi-user library is currently linked (e.g., retrieving application data objects from and/or providing data objects to) to a default data set and/or data set associated with user information different from the user currently logged in to the MDM framework. In this case, the process may proceed to step 630.

In the event it is determined that the user information associated with the user currently logged-in to the MDM framework matches the user information associated with the current data set (e.g., the data set to which the application is currently linked), the process may end. In this case, the application may be properly configured for use with the user logged into the MDM framework.

At 630, application data may be saved to the data set associated with the previous user of the application. In various embodiments, application data objects (e.g., user-generated documents, cache files, settings, etc.) may be saved to a data set associated with a previous user of the application and/or the default data set.

At 640, it may be determined whether the user information matches an existing data set. In various embodiments, it may be determined whether the user information associated with the context of the application (e.g., the user currently logged in to the application, management agent, MDM framework) matches user information associated with any existing data sets. For example, a data container (e.g., directory) associated with the application may include default data sets and/or data sets each associated with one or more users. And the multi-user library associated with the application may, for example, include a data structure (e.g., list) of data sets associated with the application and users corresponding to each data set. In the event it is determined that the user information matches user information associated with an existing data set (e.g., a previously generated data set for a user), the process may proceed to step 660. In the event it is determined that the user information does not match user information associated with any existing data set (e.g., a previously generated data set for a user), the process may proceed to step 650.

At 650, data set(s) associated with the user information may be generated. In some embodiments, the application (e.g., the multi-user library associated with the application) may generate data set(s) associated with (e.g., corresponding to) the user information. For example, it may be determined that a new user is using the application. In various embodiments, the default data set(s) associated with the application may be used as a template to generate data set(s) associated with the user information. In certain cases, a new container (e.g., directory location) may be generated for the data sets associated with the user (e.g., "<Application123_Home>/Documents/User1"). In various embodiments, multiple data sets associated with a user may be generated including, for example, a documents data set, temp data set, library data set, certificate data sets, and/or other data sets (e.g., subsets). Each of the data sets associated with the user may include application data objects used by (e.g., accessed by and/or retrieved by) the application for various purposes.

At 660, the application may be configured based on the data set associated with the user information. In various embodiments, the application may be configured to access application data objects included in data set(s) associated with the user information. For example, the multi-user library associated with an application may configure the application to access (e.g., retrieve data from and/or send data to) the data sets associated with the user information.

In various embodiments, the multi-user library associated with an application may configure the application to retrieve application data objects from a data set associated with a user. For example, the application may be configured (e.g., by the multi-user library) to retrieve application configuration data objects, user settings data objects, and/or any other application data objects from a data set associated with user information corresponding to the user. Similarly, application data objects generated and/or modified during use of the application may be stored in the data set designated by the multi-user library. In the case of a managed browser, the multi-user library associated with managed browser may retrieve browser data cache, authentication cookies, certificates, identity certificates, and/or other application data objects from a data set associated with a user information (e.g., the user).

In various embodiments, the application may be configured based on the data set associated with the user information by redirecting application programming interface (API) and/or other calls made within the context of the application. The multi-user library may, for example, point (e.g., redirect) API calls made by the application to data sets associated with the user information. The multi-user library associated with the library may, however, redirect these calls to a data set associated with user information (e.g., user information determined to be associated with the current context/user of the application). In one example, file input/output (i/o) calls made during execution of the application code may be redirected (e.g., by the multi-user library) from a first data set (e.g., a default data set) to a second data set (e.g., a data set associated with the user information).

According to some embodiments, the application may be configured to access application data objects included in data set(s) associated with the user information by replacing currently accessible data sets with data sets associated with the user information. For example prior to launch, an application may be provided access to application data objects in a first data set (e.g., a default data set). A first data set may be located in a container (e.g., directory) including, for example, "<Application123_Home>/Documents/Default." Using the techniques discussed herein, the application may be configured to access a data set associated with the user information, and the directory "<Application123_Home>/Documents/Default" may be replaced to include a data set corresponding to the user information. In this case, when the application accesses the directory, the application data objects included in the directory will be associated with the user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, by a multi-user library distinct from a single-user application in a context of the single-user application being executed on a mobile terminal, a request to access application data associated with an object identifier, wherein the single-user application comprises an application designed to be used by a single user and is used without modifying an underlying application of the single-user application;
in response to receiving the request to access application data associated with the object identifier:
upon authentication of a user of a plurality of users, retrieving from a secure storage location, by the multi-user library, user information associated with the user and comparing the retrieved user information with a current data set associated with the single-user application, wherein a data set comprises at least user documents associated with a particular authenticated user;
responsive to the retrieved user information not matching user information of the current data set, performing, by the multi-user library, a redirect to cause the single-user application to save application data associated with the current data set to a data set corresponding to a previous authenticated user and to access a data set corresponding to the retrieved user information rather than the current data set, wherein the data set corresponding to the retrieved user information is generated in the event the retrieved user information associated with the user does not match an existing data set associated with the single-user application; and
configuring, by the multi-user library, the single-user application based at least in part on the data set corresponding to the retrieved user information; and
providing access to one or more application data objects associated with the object identifier, the one or more application data objects included in the data set corresponding to the retrieved user information and associated with the single-user application.

2. The method of claim 1, wherein the one or more application data objects comprise one or more of application settings, application configurations, application data, and user data associated with the application.

3. The method of claim 1, further comprising retrieving the one or more application data objects.

4. The method of claim 1, further comprising modifying the context of the single-user application based at least in part on the one or more application data objects.

5. The method of claim 1, wherein the providing step is performed by one or more of a library associated with the application and the application.

6. The method of claim 1, wherein the data set corresponding to the retrieved user information comprises a sandbox corresponding to the user.

7. The method of claim 1, further comprising determining the user information associated with the context of the single-user application.

8. The method of claim 7, wherein determining the user information associated with the context of the single-user application includes:
receiving user credential information in a context of management agent;
validating the user credential information; and
determining the user information based at least in part on the validated user credential information.

9. The method of claim 7,
wherein the user information was provided to the storage location by a management agent.

10. The method of claim 1, further comprising:
configuring the single-user application to access data from the data set corresponding to the retrieved user information.

11. The method of claim 1, wherein the data set corresponding to the retrieved user information is generated in the event the retrieved user information associated with the user does not match an existing data set associated with the single-user application is generated at least in part by:
determining that the retrieved user information comprises new user information associated with a new user; and
generating the data set associated with the retrieved user information based at least in part on a default data set and the new user information.

12. The method of claim 1, further comprising:
associating the multi-user library with the single-user application.

13. The method of claim 1, further comprising
configuring the single-user application to communicate data associated with a data set associated with each respective user of the single-user application over a secure connection bus.

14. The method of claim 1, further comprising configuring the single-user application to generate and use the data set for each respective user of the single-user application at least in part by
configuring the single-user application to access a data set associated with the user within a context of a managed application.

15. The method of claim 1, wherein the multi-user library further configures the single-user application to use a data set associated with each respective user of the single-user application.

16. The method of claim 1, wherein a default data set is used as a template for generation of a data set associated with each respective user.

17. The method of claim 1, further comprising
redirecting the request to access application data associated with an object identifier to the data set corresponding to user information associated with the context of the application, wherein the request to access application data associated with an object identifier is sent in a form that is consistent with an access request to an unmodified version of the single-user application.

18. A system, comprising:
a processor; and
a memory coupled with the processor, wherein the memory is configured to provide the processor with instructions which when executed cause the processor to:
receive, by a multi-user library distinct from a single-user application in a context of the single-user application being executed on a mobile terminal, a request to access application data associated with an object identifier, wherein the single-user application comprises an application designed to be used by a single user and is used without modifying an underlying application of the single-user application;
in response to receiving the request to access application data associated with the object identifier:
upon authentication of a user of a plurality of users, retrieve from a secure storage location, by the multi-user library, user information associated with the user and compare the retrieved user information with a current data set associated with the single-user application, wherein a data set comprises at least user documents associated with a particular authenticated user;
responsive to the retrieved user information not matching the user information of the current data set, cause the multi-user library to perform a redirect to cause the single-user application to save application data associated with the current data set to a data set corresponding to a previous authenticated user and to access the a data set corresponding to the retrieved user information rather than the current data set, wherein the data set corresponding to the retrieved user information is generated in the event the retrieved user information associated with the user does not match an existing data set used by the single-user application; and
configure, by the multi-user library, the single-user application based at least in part on the data set corresponding to the retrieved user information; and
provide access to one or more application data objects associated with the object identifier, the one or more application data objects included in the data set corresponding to the retrieved user information and associated with the single-user application.

19. The system of claim 18, wherein the processor is further configured to retrieve the one or more application data objects.

20. The system of claim 18, wherein the processor is further configured to modify the context of the single-user application based at least in part on the one or more application data objects.

21. A computer program product, the computer program product being embodied in a tangible non-transitory computer readable storage medium and comprising computer instructions for:
receiving, by a multi-user library distinct from a single-user application in a context of the single-user application being executed on a mobile terminal, a request to access application data associated with an object identifier, wherein the single-user application comprises an application designed to be used by a single user and is used without modifying an underlying application of the single-user application;
in response to receiving the request to access application data associated with the object identifier:
upon authentication of a user of a plurality of users, retrieving from a secure storage location, by the multi-user library, user information associated with the user and comparing the retrieved user information with a current data set associated with the single-user application, wherein a data set comprises at least user documents associated with a particular authenticated user;
responsive to the retrieved user information not matching the user information of the current data set, performing, by the multi-user library, a redirect to cause the single-user application to save application data associated with the current data set to a data set corresponding to a previous authenticated user and to access a data set corresponding to the retrieved user information rather than the current data set, wherein the data set corresponding to the retrieved user information is generated in the event the retrieved user information associated with the user does not match an existing data set used by the single-user application; and
configuring, by the multi-user library, the single-user application based at least in part on the data set corresponding to the retrieved user information; and
providing access to one or more application data objects associated with the object identifier, the one or more application data objects included in the data set corresponding to the retrieved user information and associated with the single-user application.

22. The computer program product recited in claim 21, further comprising computer instructions for:
determining the user information associated with the context of the single-user application.

23. The computer program product recited in claim 22, wherein determining the user information associated with the context of the single-user application includes computer instructions for:
receiving user credential information in a context of a management agent;
validating the user credential information; and
determining the user information based at least in part on the validated user credential information.

* * * * *